B. W. KADEL.
CAR TRUCK.
APPLICATION FILED FEB. 16, 1914.

1,124,746.

Patented Jan. 12, 1915.

2 SHEETS—SHEET 1.

Witnesses
Victor Frederiksen.
M. H. Martin

Inventor
B. W. Kadel.

B. W. KADEL.
CAR TRUCK.
APPLICATION FILED FEB. 16, 1914.
1,124,746.
Patented Jan. 12, 1915.
2 SHEETS—SHEET 2.
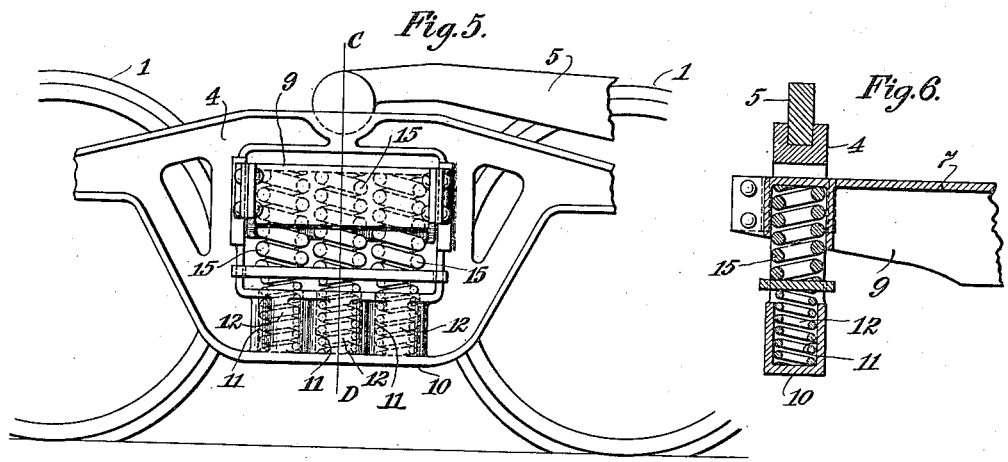
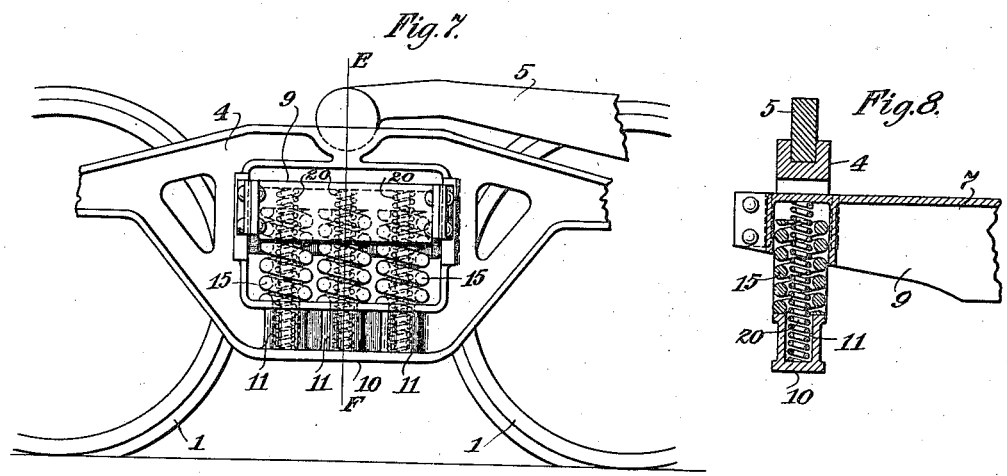
Witnesses
Victor Frederiksen.
M. H. Martin.
Inventor
B. W. Kadel.

UNITED STATES PATENT OFFICE.

BYERS W. KADEL, OF ROANOKE, VIRGINIA.

CAR-TRUCK.

1,124,746. Specification of Letters Patent. Patented Jan. 12, 1915.

Application filed February 16, 1914. Serial No. 818,975.

*To all whom it may concern:*

Be it known that I, BYERS W. KADEL, a citizen of the United States, residing in the county of Roanoke and State of Virginia, have invented certain new and useful Improvements in Car-Trucks, of which the following is a specification.

This invention relates to improvements in car trucks and has for its object to provide means for more nearly equalizing the wheel loads and also to provide a truck that will be easy of inspection and in which broken springs may be readily replaced.

With these and other objects in view my invention consists in the construction and the arrangement of elements as will be herein described and finally claimed.

Figure 1:
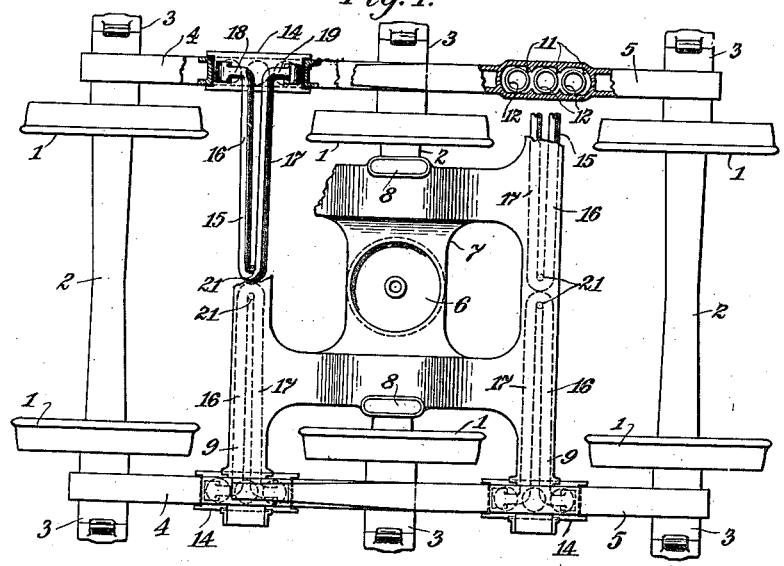
Figure 2:
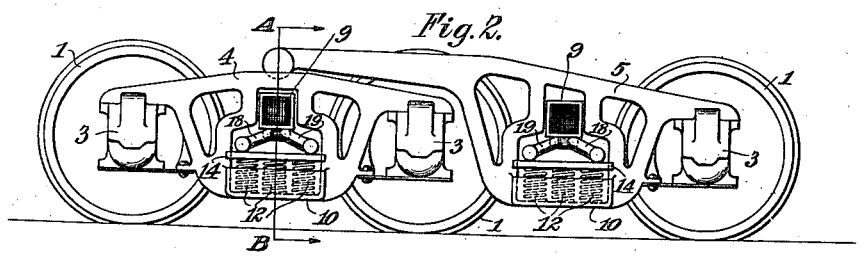
Figure 3:
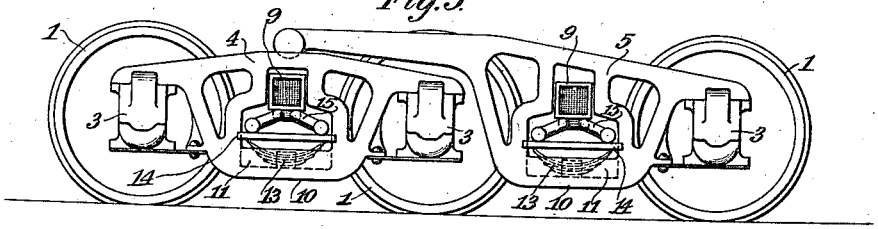
Figure 4:
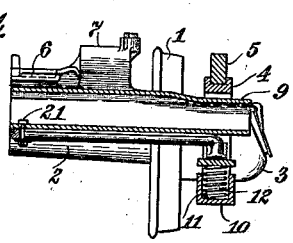

In the accompanying drawings Figure 1 is a plan view, partly in section, of the truck of my invention, and Fig. 2 a side elevation of the same. Fig. 3 shows a side elevation of my truck having a modified form of light car springs. Fig. 4 shows a half sectional elevation of the truck of my invention taken on the line AB, Fig. 2. Fig. 5 shows a part side elevation of my truck having a modified form of loaded car springs and Fig. 6 is a part sectional elevational view of the same, taken on the line CD, Fig. 5. Fig. 7 shows a part side elevation of my truck having a modified form of both light car springs and loaded car springs and Fig. 8 is a part sectional elevational view of the same taken on the line EF, Fig. 7.

The general construction of the truck depicted in the drawings is the same as that shown and described in the application of Lewis-Pilcher, Serial No. 787148, filed August 28, 1913, but the various features of my invention as shortly to be described will be found applicable to many other forms of six wheel trucks as well as to four wheel trucks.

In car trucks generally and particularly in freight car trucks it has been difficult heretofore to maintain proper equalization of the weight of the light car among the various wheels. This is due to the fact that the truck springs must be made heavy enough to carry the loaded car, hence the weight of the light or empty car is not sufficient to deflect the springs to any appreciable amount. The result of this is that when a low place is encountered in the track a wheel will be momentarily relieved of its superimposed load because there is not enough spring travel to compensate for the sudden drop. Consequently the car will be readily derailed under such a condition.

In four wheel trucks, where the truck springs are located on or near the center line of the truck a very small amount of spring travel will compensate for a considerable drop of the wheel, but in six wheel trucks, especially those having bolsters of platform construction, the springs are often located at some distance from the center of the truck. Hence a slight drop in the track will entirely relieve the wheel of the superimposed load unless special provision is made to avoid this.

This difficulty is especially evident in the newer and larger types of freight cars where the light weight of the car is so much less in proportion to the gross load than in some of the older types of cars.

To correct this trouble various means have been employed, as for example, in passenger equipment trucks it is customary to use two sets of springs working in series, thus obtaining greater deflection. It is customary, however, to make each set of springs heavy enough to support the entire load. This has proven successful for these trucks, inasmuch as there is never a great variation in the superimposed load, but in freight service, the wide variation of loads in conjunction with the restrictions as to the maximum and minimum allowable height of couplers will not permit the use of springs with a wide range of deflection, from the light car to the loaded car.

In freight cars, graduated springs have been used, that is, springs made up of outer coils of heavy wire and inner coils of lighter wire. The inner coils are made longer than the outer coils and when the empty car body is let down on the truck these inner coils are deflected until the heavier outer coils come into action and the weight of the lading is then carried mainly by the outer coils. This has proven partly successful, but the height available for these springs has necessitated a design of inner coils that work at an excessive stress when the outer coils go solid.

In the truck elements of my invention, I am enabled to use a longer inner coil for such a graduated spring, or I am enabled to provide a light car spring that will go out of action at any predetermined deflection or stress and the further load will be taken by the heavier springs alone. At the same time I am enabled to use a heavy spring that not only is easy of replacement but that admits of much more ready inspection of the various truck parts, especially the brakes.

Referring now to the drawings in which like parts are given the same reference numbers wherever they occur, 1 represents the wheels of a six wheel truck on their axles, 2. These axles are journaled in the customary journal boxes 3 and the journal boxes are secured to the side frames 4 and 5.

The weight of the car body is carried on a center plate 6 which is formed integral with or secured to the truck bolster 7, the truck bolster being provided with side bearings at 8. The truck bolster 7 is further provided with outwardly extending arms 9 which are adapted to carry the load of the car body to the springs. All of these parts, however, may be of any of the customary designs, this particular type of truck being shown to illustrate what may be accomplished by my invention.

In trucks as now constructed the springs rest on the top of and are supported by the bottom member 10 of the side frames. In the truck of my invention, however, I provide pockets 11 in this side frame member and the springs 12 for the light or empty car are let down into these pockets. These light car springs may be of any type, either coil springs as shown at 12 in Figs. 1—2 and 4 or leaf springs 13 as shown in Fig. 3. While the pockets for the light car springs are necessarily located in the side frames in this particular form of truck, yet in some types of trucks it might be necessary to locate them in other of the truck members, as for example in a four wheel freight truck the springs ordinarily are carried on a transverse spring plank. Hence in such a truck the depressed pockets would be in that member.

Resting on the light car springs is a plate or bearing 14 which is adapted to support the heavy springs 15. When the weight of the light car is let down on the plates 14 the light car springs will be deflected and the plate 14 will come nearly or altogether solid on the top of the side frame member 10 or on some suitable stop, a convenient form of stop being to allow the light car springs to come solid. Thus it will be seen that the light car springs will never be worked beyond a predetermined stress and at the same time as great a deflection of the same may be secured as is deemed desirable, inasmuch as the light car springs may be worked at a high fiber stress under the light car load. The additional load coming from the truck bolster after the light car springs have gone solid or after the plate 14 has reached its stop will have no further effect on the light car springs but will affect the heavier, or loaded car springs only. Thus is will be seen that the two sets of springs work in series with each other up to a certain point and it will be further understood that while the light car springs 12 and 13 may not be entirely out of service at the light car load, yet their purpose is to provide deflection under the light car load, hence may be properly termed light car springs. Likewise, although the heavy or loaded car springs 15 are in action when the car is light or empty, yet their purpose is to support the heavy load coming from the loaded car and for this reason are herein termed loaded car springs.

The loaded car springs 15 may be of any desired form, coil springs being shown in Figs. 5 and 6. But by the use of the light car springs let down into the pockets, I am enabled to use springs of torsional bars disposed transversely of the truck and having longitudinally extending lever ends at the outside. In order to be easy of application these springs might conveniently be made in U-shape as shown in Figs. 1—2—3 and 4, the weight of the bolster coming on the outer ends of the torsion bars or legs 16 and 17 and being transferred thence through the longitudinal lever ends 18 and 19 to the plates 14. The reactions of the loads coming at the outer ends of the levers 18 and 19, a torsional stress is induced in the legs 16 and 17 of the U. At the inner end of this spring a bolt or clip 21 is supplied in order to take care of the slight tendency of this end to move.

It will, of course, be evident that various similar forms of torsional springs might be used here, as for example, the torsion bar might extend entirely across the truck, having reversely disposed lever arms at the opposite ends. Like-wise the inner end of the torsion bar might be simply held from turning.

The advantages of this form of spring over the coil springs as shown in Figs. 5 and 6 are seen in that it can be used in less height than the coil springs: in that it is more readily assembled and removed; and in that it provides more open spaces for the inspection of brake shoes.

In Figs. 7 and 8 is shown an arrangement of graduated springs as applied to the side frames of my truck. In this, as in the previous cases, the inner coils 20 are let down into the pockets 11 in the members 10 of the side frames and while this inner or light car spring will continue to work at ever increasing stresses until the outer coil goes solid yet the increased height obtainable by the use of the pockets in the side frames would prove of great benefit in this construction.

Thus it will be evident that various changes in details and applications might be made in my invention by those skilled in the art without departing from the spirit of the same.

Having thus described my invention, what I claim is:

1. In a car truck, side frames, springs adapted to support the light car, pockets in said side frames adapted to receive said light car springs, and additional springs adapted to support the loaded car, said loaded car springs being supported by said side frames and being disposed without the said pockets in the side frames.

2. In a car truck, side frames, springs adapted to support the light car, pockets in said side frames adapted to receive the said light car springs, and additional springs adapted to support the loaded car, said loaded car springs being supported by said side frames and being disposed without and above the said pockets in the side frames.

3. In a car truck, side frames, springs adapted to support the light car, pockets in said side frames adapted to receive the said light car springs, and additional springs superimposed on said light car springs and adapted to support the loaded car.

4. In a car truck, side frames, springs adapted to support the light car, pockets in said side frames adapted to receive the said light car springs, additional springs superimposed on said light car springs and adapted to support the loaded car, and means for stopping the action of the light car springs.

5. In a car truck, side frames, springs adapted to support the light car, pockets in said side frames adapted to receive the said light car springs, plates resting on said light car springs, and additional springs resting on said plates and adapted to support the loaded car.

6. In a car truck, side frames, springs adapted to support the light car, pockets in said side frames adapted to receive the light car springs, plates resting on said light car springs, additional springs resting on said plates and adapted to support the loaded car, and a stop adapted to limit the movement of the said plate on the said light car springs.

7. In a car truck, springs adapted to support the light car and additional springs adapted to support the loaded car, said loaded car springs consisting of torsional bars disposed transversely of the truck and having longitudinally extending levers at their outer ends.

8. In a car truck, springs adapted to support the light car and additional springs working in series therewith adapted to support the loaded car, said loaded car springs consisting of torsional bars disposed transversely of the truck and having longitudinally extending levers at their outer ends.

9. In a car truck, springs adapted to support the light car, supports for said light car springs having pockets adapted to receive the same, additional springs working in series with said light car springs and adapted to support the loaded car, said loaded car springs consisting of torsional bars disposed transversely of the truck and having longitudinally extending levers at their outer ends.

10. In a car truck, side frames, springs adapted to support the light car, pockets in said side frames adapted to receive the said light car springs, and additional springs adapted to support the loaded car, said loaded car springs consisting of torsional bars disposed transversely of the truck and having longitudinally extending levers at their outer ends.

11. In a car truck, side frames, springs adapted to support the light car, pockets in said side frames adapted to receive the said light car springs, additional springs superimposed on said light car springs and adapted to support the loaded car, said loaded car springs consisting of torsional bars disposed transversely of the truck and having longitudinally extending levers at their outer ends.

12. In a car truck, side frames, springs adapted to support the light car, pockets in said side frames adapted to receive the said light car springs, plates resting on said light car springs, and additional springs resting on said plates and adapted to support the loaded car, said loaded car springs consisting of torsional bars disposed transversely of the truck and having longitudinally extending levers at their outer ends.

13. In a car truck, side frames, springs adapted to support the light car, pockets in said side frames adapted to receive the said light car springs, additional springs superimposed on said light car springs and adapted to support the loaded car, said loaded car springs consisting of torsional bars disposed transversely of the truck and having longitudinally extending levers at their outer ends, and means for stopping the action of the light car springs.

14. In a car truck, side frames, springs adapted to support the light car, pockets in said side frames adapted to receive the said light car springs, plates resting on said light car springs, and additional springs resting on said plates and adapted to support the loaded car, said loaded car springs consisting of torsional bars of U-shape disposed transversely of the truck and having longitudinally extending levers at the outer ends of each of the legs of the U.

In testimony whereof I affix my signature in presence of two witnesses.

BYERS W. KADEL.

Witnesses:
W. B. KERR,
H. B. WADE.